United States Patent [19]

Lendaro

[11] Patent Number: 4,855,828
[45] Date of Patent: Aug. 8, 1989

[54] TELEVISION SYNCHRONIZING ARRANGEMENT

[75] Inventor: Jeffery B. Lendaro, Noblesville, Ind.

[73] Assignee: RCA Licensing Corp., Princeton, N.J.

[21] Appl. No.: 174,928

[22] Filed: Mar. 29, 1988

[51] Int. Cl.$^4$ ............................................... H04N 5/04
[52] U.S. Cl. ...................................... 358/148; 358/158
[58] Field of Search ........................ 358/148, 158, 159;
331/74–77, 25, 20; 307/520, 521, 522; 315/387, 388

[56] References Cited

U.S. PATENT DOCUMENTS

| | | | |
|---|---|---|---|
| 3,575,666 | 4/1971 | Wantagh | 358/159 |
| 3,891,800 | 6/1975 | Janssen et al. | 358/159 |
| 4,292,654 | 9/1981 | Steckler et al. | |
| 4,769,705 | 9/1988 | Lendaro | 358/158 |

OTHER PUBLICATIONS

A data sheet of a linear integrated circuit CA3210E and CA3223E of the RCA Corporation published May, 1982, entitled, TV Horizontal/Vertical Countdown Digital Sync System.

U.S. Patent Application No. 068,085, filed 6/30/87, entitled Deflection Synchronizing Apparatus, in the name of J. B. Lendaro, the applicant of the above-captioned patent application.

Primary Examiner—James J. Groody
Assistant Examiner—David E. Harvey
Attorney, Agent, or Firm—E. M. Whitacre; J. J. Laks; S. S. Henig

[57] ABSTRACT

A phase-lock-loop circuit of a two-loop deflection arrangement is located in a first integrated circuit. The phase-lock-loop circuit generates a first signal at $32Xf_H$ that is capacitively coupled to a tank circuit. A regenerative amplifier stage that is located in a second integrated circuit has an input terminal that is coupled to the tank circuit and an output terminal for producing a second signal. During normal operation, the second signal is synchronized to the first signal. The second signal is utilized in a phase-control-loop circuit of the two-loop deflection arrangement for generating a synchronized deflection current in a deflection winding.

15 Claims, 1 Drawing Sheet

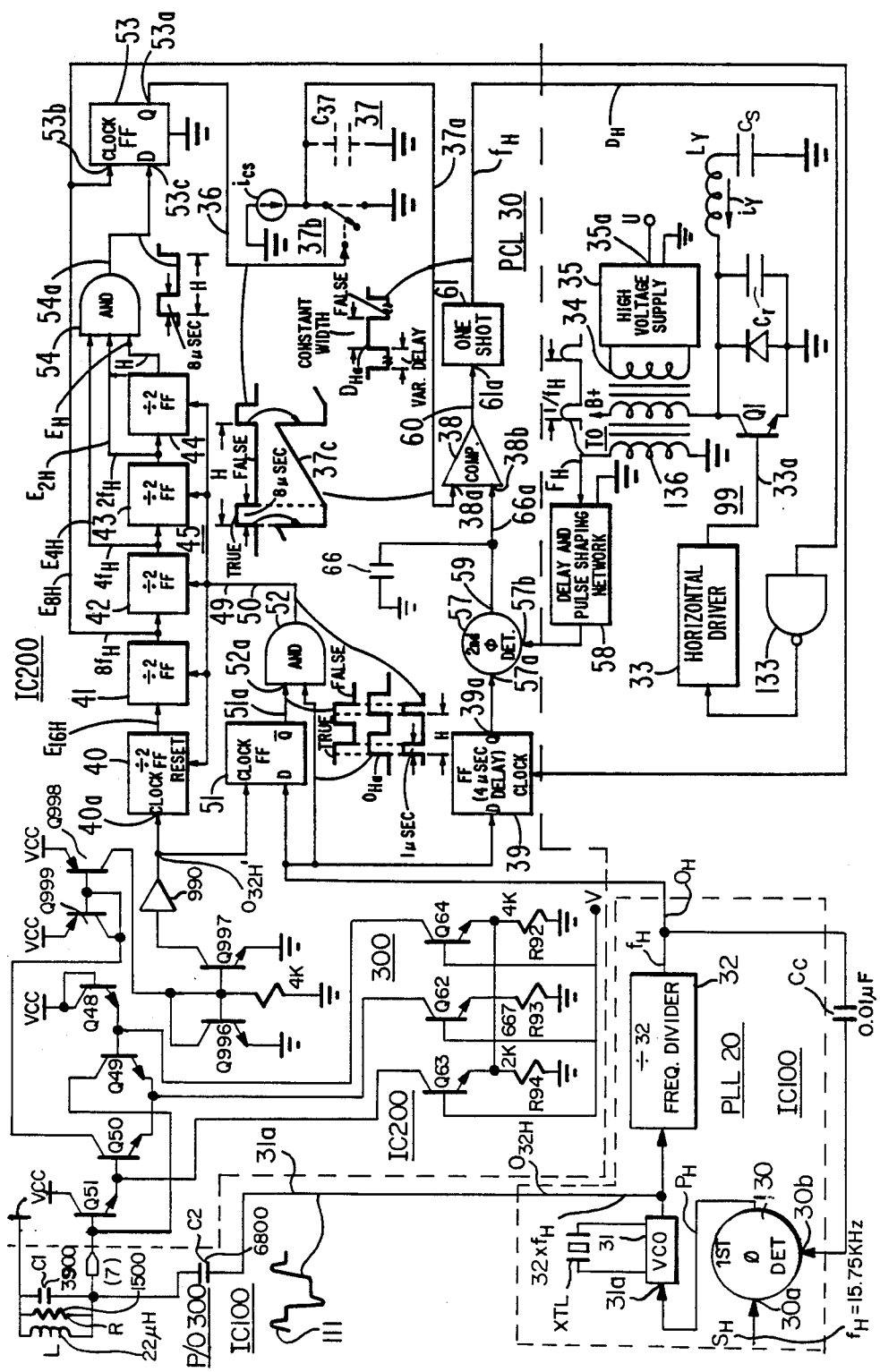

TELEVISION SYNCHRONIZING ARRANGEMENT

BACKGROUND OF THE INVENTION

This invention relates to a deflection synchronizing arrangement for a television apparatus.

Display of a television signal picture may be accomplished by repetitively scanning an electron beam over the surface of a picture tube viewing screen. The beam intensity is modulated by video signals to form images on the screen representative of the picture to be displayed. In order to synchronize the scanning of the beam with the display information, the scanning or deflection circuits are synchronized with a synchronizing signal combined with the image information in a composite video signal. As received, the synchronizing signal may contain distortions in the form of electrical noise.

As transmitted, the synchronizing signal pulses recur at a rate which is stable. Because of the presence of noise it has become common practice to obtain synchronization of the horizontal deflection circuit with the horizontal synchronizing signal pulses by the use of an oscillator. The oscillator is controlled by and is included in a phase-lock loop (PLL). The oscillator generates a signal at a frequency that is equal to, for example, a high multiple of the synchronizing signal frequency $f_H$. Because of the PLL operation, when, for example, one synchronizing pulse is obscured by noise, the rate of the oscillator, nevertheless, remains substantially unchanged, and the deflection circuits continue to receive regular deflection control pulses.

It may be desirable, for purposes of stability of the PLL, to use an oscillator operating at a frequency that is greater than $f_H$ that is followed by a frequency divider that produces from the oscillator signal a horizontal-rate output signal with high stability. The horizontal rate output signal may be locked by the PLL to the average phase of the incoming synchronizing signal. Such PLL is internal to, for example, an integrated circuit (IC) TA 7777 that is made by Toshiba Co. That IC or other similar integrated current produces, at a corresponding pair of output terminals, a first output signal at the horizontal frequency $f_H$ and a second output signal at a frequency that is 32 times the horizontal frequency $f_H$, respectively. The first output signal may be used in a television receiver to produce the horizontal rate deflection current.

In the normal operation of a television receiver, a horizontal deflection circuit output stage produces high-voltage retrace pulses. It is customary to derive a high ultor voltage required for operation of a kinescope of the receiver by rectifying and filtering the high-voltage pulses.

The timing of a deflection current in a deflection winding and of the retrace pulses produced by the horizontal deflection circuit output stage may vary in a manner dependent upon loading of the ultor voltage generating circuit. For example, such loading is dependent upon the brightness of the image being displayed on the kinescope. This variation in the timing of the horizontal retrace pulses, disadvantageously, may cause a distortion of the image being displayed.

To prevent the occurrence of a variation in a delay of the deflection current relative to the synchronizing signal, a dual feedback loop arrangement may be used. In such arrangement, a horizontal oscillator generates a signal at, for example, a frequency greater than the horizontal frequency. The oscillator generated signal is divided down in a frequency divider and an output signal near the horizontal frequency is generated. A PLL having a relatively long time constant controls the oscillator to maintain the output signal in frequency and phase synchronism with horizontal synchronizing signals. The frequency divider may be included in the PLL. In order to compensate for load-dependent variations in the delay of the horizontal deflection circuit output stage, a phase-control loop circuit (PCL) may be used. The PCL includes a phase detector, a first input terminal of which is coupled to an output of the PLL and a second input terminal of which is coupled to the deflection circuit output stage for responding to the retrace pulses. The phase detector produces a phase difference indicative signal from the signals at the first and second input terminals. A loop filter is coupled to an output of the phase detector to form a control signal. A controllable phase shifter is responsive to the control signal that is generated by the loop filter for producing horizontal-rate drive pulses at a variable delay which makes the retrace pulses synchronous with the output signal of the PLL even when variations of beam current loading occur. The PCL may require for its internal operation timing signals at various multiple frequencies of the horizontal frequency that are at corresponding predetermined constant phases relative to the horizontal rate output signal of the PLL. Each of such timing signals may be generated from, for example, the second output signal that is generated in the PLL that is at a high multiple, or 32 of the horizontal frequency.

The PCL may be located internally to a second IC that is separate from the first IC that generates the second output signal. An indicated before, the second output signal is at the fundamental frequency that is equal to $32Xf_H$. In addition to the signal component at the fundamental frequency of $32Xf_H$, the second output signal may include undesirable high order harmonics that cause the waveform of the second output signal to deviate from an ideal square-wave. Such undesirable harmonics may, disadvantageously, cause perturbation in synchronizing the PCL of the second IC.

It may be desirable to couple the $32Xf_H$ signal from the first IC to the second IC via a coupling arrangement such that the high order harmonics from the PLL are prevented from adversely affecting the operation of the PCL in the second IC.

When, for example, a user selects a new television channel for viewing, the second output signal at $32Xf_H$ generated by the PLL in the first IC may be significantly disturbed during a transition interval as a result of a loss of a horizontal synchronizing signal. Such disturbance may, disadvantageously, cause a temporary loss of a drive signal generated by the PCL, causing a temporary shutdown in a deflection circuit output stage. This is so because when the drive signal generated by the PCL in the second IC is lost the output stage does not produce the ultor voltage and other energizing voltages that are required for operating the television receiver. Moreover, if the drive signal is erroneously generated at a frequency that is substantially lower than the nominal frequency $f_H$, the ultor voltage may increase to such a level that causes a high voltage protection circuit to initiate a complete shutdown. Therefore, it may be desirable to provide the PCL in the second IC, during such disturbances, with a signal at, approximately, the frequency $32Xf_H$, should the second output signal be significantly disturbed.

SUMMARY OF THE INVENTION

In accordance with a feature of the invention, the second IC includes a regenerative amplifier stage having positive feedback. During normal steady state operation, the second output signal of the PLL of the first IC that is at $32Xf_H$ is capacitively coupled to a tank circuit. The tank circuit is coupled to an input terminal of the amplifier stage for maintaining an output signal of the regenerative amplifier stage in the second IC synchronized to the second output signal of the first IC. The output signal of the regenerative amplifier stage is coupled to the PCL. The waveform of the output signal of the regenerative amplifier stage is determined by elements of the tank circuit. The positive feedback in the regenerative amplifier stage provides hysteresis that, advantageously, prevents the undesirable harmonics of the second output signal from adversely affecting the waveform of the output signal of the regenerative amplifier stage.

During normal operation, the second output signal of the PLL advantageously, controls the phase of the output signal of the regenerative amplifier stage by synchronizing the output signal of the regenerative amplifier stage to the second output signal of the PLL. At the same time, signal perturbations in the second output signal that may be caused by the undesirable harmonics are, advantageously, prevented from affecting the waveform of the regenerative amplifier stage output signal.

In accordance with another feature of the invention, the regenerative amplifier stage may be designed to operate as an oscillator. When the second output signal of the PLL of the first IC is significantly disturbed by, for example, changing channel selection in a television receiver, the regenerative amplifier, operating as an oscillator, enables the uninterrupted generation of the drive signal at a frequency that is close to its nominal frequency. In this way, advantageously, shutdown of, for example, the high voltage power supply in the deflection circuit output stage is prevented.

In accordance with an aspect of the invention, a television deflection apparatus includes a source of a synchronizing input signal at a frequency that is related to a deflection frequency, a resonant circuit and a phase-lock-loop circuit including a first oscillator responsive to the input signal. The oscillator generates a first signal at a frequency that is related to the deflection frequency. The first signal is coupled to the resonant circuit. The resonant circuit is tuned to generate a second signal that is synchronized to the first signal such that undesirable high order harmonics are filtered out from the second signal. A amplifier stage having regenerative feed back and having an input terminal that is coupled to the second signal generates a third signal at a corresponding frequency. A ramp generator responsive to the third signal generates a ramp signal having a sawtooth waveform at a phase that is determined by a phase of the third signal. A deflection circuit output stage responsive to a control signal generates a deflection current in a deflection winding at a phase that is determined by a phase of the control signal and generates a phase indicative signal that is indicative of the phase of the deflection current. A phase detector responsive to the synchronizing signal and to the phase indicative signal generates a phase difference indicative signal in accordance with a phase difference between the phase indicative signal and the synchronizing signal. Phase shifting arrangement responsive to the phase difference signal and to the ramp signal generates the control signal having the phase that varies in accordance with the phase difference signal. dr

IN THE DRAWING;

The sole FIGURE illustrates a phase-lock-loop circuit that is coupled to a phase-control-loop circuit via an arrangement, embodying the invention, that controls the phase of a deflection current in a deflection winding.

DETAILED DESCRIPTION

In the horizontal deflection circuit of the FIGURE, horizontal sync pulses $S_H$ having a period H, that in NTSC is 63.5 microseconds, and having a corresponding frequency $f_H$ are coupled, illustratively, from a conventional sync separator of a television receiver, not shown in the FIGURE, to an input terminal $30a$ of a phase detector 130. A signal $O_H$ that during steady state operation is at the frequency $f_H$ is coupled via a capacitor $C_c$ to a second input terminal $30b$ of phase detector 30. A phase difference indicative signal PH that is indicative of the phase difference between signal $S_H$ and signal $O_H$ that is generated by phase detector 30 is coupled to a frequency control input terminal $31a$ of a voltage controlled oscillator 31. Oscillator 31 generates an output signal $O_{32H}$ at a frequency $32xf_H$ in accordance with an inductive-capacitive, frequency determining resonant element, crystal XTL. Signal $O_{32H}$ is frequency divided by 32 in a frequency divider 32 to produce signal $O_H$. Detector 130, oscillator 31 and frequency divider 32 form a phase-lock-loop circuit (PLL) 20 that may be included in a first integrated circuit (IC) 100 such as, for example, the aforementioned Toshiba IC. The operation of PLL 20 causes signals $O_H$ and $O_{32H}$ to be synchronized with signal $S_H$.

A phase-control-loop (PCL) 30, having a control section that may be internal to a second integrated circuit 200, is responsive to a signal $O_{32H}'$, at $32Xf_H$, that is generated by a waveshaping and synchronizing arrangement 300, embodying an aspect of the invention.

Arrangement 300 includes transistors Q49 and Q50 coupled as a differential amplifier. A transistor Q62 provides a collector current that is coupled to the emitter electrodes of transistors Q49 and Q50. A transistor Q51 operating as an emitter follower has an emitter electrode that is coupled to a base electrode of transistor Q50. An emitter current of transistor Q51 is supplied by a transistor Q63 having its collector electrode coupled at a junction between the base of transistor Q50 and the emitter of transistor Q51. A transistor Q48 coupled as a diode between a supply voltage $V_{cc}$ and a base electrode of transistor Q49 provides temperature compensation for temperature dependent variations of the emitter-base junction of transistor Q51. Thus, the threshold of the differential amplifier is approximately equal to voltage $V_{cc}$.

A transistor Q64 having its collector coupled to a junction between the base of transistor Q49 and the emitter of transistor Q48 supplies the emitter current of transistor Q48. The base electrode of each of transistors Q61, Q62, and Q63 is controlled by a temperature compensated voltage V produced by an arrangement that is not shown in the FIGURE that causes, in a well known manner, the collector current in each transistor to be substantially temperature independent over an entire operating temperature range. A collector electrode of transistor Q49 is coupled back to the base electrode of transistor Q51 to provide positive feedback in the differential amplifier. Sufficient positive feedback may be developed so as to cause the amplifier to operate as a regenerative amplifier stage with hystereses. The base electrode of transistor Q51 is coupled to an input terminal, pin 7, of IC 200. An externally coupled parallel arrangement of an inductor L, a resistor R and a capacitor C1 forms a resonant or tank circuit that is tuned to approximately $32Xf_H$. A capacitor C2 couples signal $O_{32H}$ to the tank circuit to provide synchronization. Resistor R determines the Q of the tank circuit.

The collector of transistor Q50 is coupled via a first current mirror arrangement that includes transistors Q998 and Q999, via a second current mirror arrangement that includes transistors Q996 and Q997 and via a gate 990 to form signal $O_{32H}'$ at an input terminal 40a of a flip-flop 40.

In accordance with a feature of the invention, by selecting the value of resistor R sufficiently large, the positive feedback will result in arrangement 300 being designed to operate as a free running oscillator at about $32Xf_H$. During normal operation of arrangement 300, operating as an oscillator, the oscillator is synchronized or pulled-in by signal $O_{32H}$ that is coupled to the tank circuit via DC blocking capacitor C2. When synchronized, arrangement 300 operates as an oscillator in a slave mode such that VCO 31 of PLL 20 is the master that controls the phase and frequency of arrangement 300. Alternatively, by selecting resistor R of a smaller value, the differential amplifier may be designed to operate without sustaining oscillation.

Signal $O_{32H}$ may include undesirable high order harmonics that form, for example, a spike 111 in the waveform shown. The undesirable high order harmonics may be produced in VCO 31 of PLL 20, such as may occur when signal $O_{32H}$ is taken from pin 63 of the aforementioned Toshiba IC. The phase of each of the high order harmonics may vary relative to the phase of the signal component of signal $O_{32H}$ at the fundamental frequency $32Xf_H$. Such variation may occur during, for example, the time when PLL 20 is in a transient mode of operation while locking in to signal $S_H$. The phase variation of each of the harmonics may, disadvantageously, cause a phase jitter in signal $O_{32H}'$. Also it may cause the duty cycle of signal $O_{32H}'$ to vary from its nominal value of 50%. Deviation from the nominal value of the duty cycle may adversely affect the operation of PCL 30 that is described in detail later on.

The tank circuit formed by inductor L, capacitor C1 and resistor R advantageously filters out from the input signal of IC 200 at pin 7 spurious signal components at frequencies that are different from the fundamental frequency $32Xf_H$. Furthermore, hysteresis provided by the positive feedback path that includes the collector of transistor Q49 advantageously prevents the undesirable high order harmonics from affecting switching transition times in transistors Q49 and Q50. These transition times provide to PCL 30 the necessary phasing information developed by PLL 20.

The hysteresis feature of the differential amplifier and/or the filtering effect of the tank circuit cause signal $O_{32H}$ to be a square wave with a 50% duty cycle. The 50% duty cycle is desirable for proper operation of digital circuits that are included in PCL 30, described later on.

PCL 30 generates a signal $D_H$ at the frequency $f_H$. Signal $D_H$ is coupled via an inverter 133 to a horizontal driver 33 that generates a signal 33a that is coupled to a base electrode of a switching transistor Q1. Transistor Q1 is included in, for example, a conventional horizontal output stage 99. Output stage 99 produces, in a winding 34 of a flyback transformer T0, a retrace pulse at a high voltage that is used, in a high voltage supply 35, for generating an ultor voltage U. Voltage U is coupled to an ultor electrode of a cathode ray tube, not shown in the FIGURE, of the television receiver. PCL 30 is synchronized to signal $O_H$ in such a way that deflection current $i_Y$ in a deflection winding $L_Y$ is maintained in a constant phase relationship relative to signal $O_H$ despite varying beam current loading that loads winding 34 in a manner to be described in detail later on.

As explained before, arrangement 300 may be designed to operates as an oscillator. In such embodiment of the invention, arrangement 300 will generate signal $O_{32H}'$ even in the absence of signal $O_{32H}$ because of the positive feedback via the collector of transistor Q49 that causes it to operate as an oscillator. Thus, if signal $O_{32H}$ is disturbed as a result of, for example, tuning the television to receive a new television channel, arrangement 300 will operate as an oscillator in a master mode during a corresponding transient interval that may continue until VCO 31 is phase locked to signal $S_H$. Therefore, advantageously, output stage 99 will continue to operate and to produce ultor voltage U during the transient interval.

IC 200 includes a frequency dividing arrangement 45. Arrangement 45 includes flip-flop 40 having clock receiving input terminal 40a that receives signal $O_{32H}'$ that is at the frequency $32xf_H$. Flip-flop 40 generates an output signal $E_{16H}$ that toggles, or changes states, each time a clocking edge of signal $O_{32H}'$ occurs. Signal $E_{16H}$ is at a frequency $16xf_H$ that is one-half of the frequency of signal $O_{32H}$. Flip-flop 40 forms the first stage in five-stage cascaded-coupled frequency dividing arrangement 45 that includes flip-flops 40-44. Arrangement 45 generates corresponding output signals $E_{16H}$, $E_{8H}$, $E_{4H}$, $E_{2H}$ and $E_H$ at frequencies $16xf_H$, $8xf_H$, $4xf_H$, $2xf_H$ and $f_H$, respectively, at corresponding output terminals of flip-flops 40-44. For proper operation arrangement 45 may require signal $O_{32H}'$ to have 50% duty cycle, generated in the manner that was explained before.

Horizontal rate signal $O_H$ is coupled via an "AND" gate 52 to a corresponding reset pulse receiving terminal RESET of each of flip-flops 40-44 for abruptly resetting the phase of each of signals $E_{16}H$, $E_{8H}$, $E_{4H}$, $E_{2H}$ and $E_H$ to insure that they conform to that of signal $O_H$. Resetting the phase of such signals is done by causing each of flip-flops 40-44 to assume abruptly a FALSE state when a leading edge $O_{Ha}$ of signal $O_H$ occurs, as described later on. In this way, flip-flops 40-44 are initialized. Initializing flip-flops 40-44 is required because flip-flops 40-44 are outside the feedback loop of PLL 20. If flip-flop 40-44 were not initialized, the phase of each of the output signals of flip-flops 40-44 would not be predetermined, resulting in improper operation of PCL 30.

Flip-flop 51 delays signal $O_H$ by approximately one microsecond to form a delayed signal 51a that is also inverted. The one microsecond delay time is caused by using a transition edge of signal $O_{32H}'$ to clock flip-flop 51. This edge occurs between the transition edges used for clocking frequency divider $32_H$. The delayed signal 51a that is coupled to an input terminal 52a of "AND" gate 52 disables gate 52 one microsecond after leading edge $O_{Ha}$ of signal $O_H$. Thus a pulse 50 is generated on a conductor 49 when both signals 51a and $O_H$ are simultaneously at corresponding TRUE state. Pulse 50 that has a duration of approximately one microsecond and that is at the horizontal rate $f_H$ is synchronized to signal $O_H$. When pulse 50 occurs, each of flip-flops 40-44 is initialized to provide the corresponding output signal at a corresponding predetermined state such as, for example, a FALSE state.

Each of the output signals of flip-flops 40-44 is also periodic at the frequency $f_H$ of signal $O_H$ or signal 50. Therefore, if no significant phase perturbation in signals $O_H$ and $O_{32H}'$ of PLL 20 occurs, each of the corresponding output signals of flip-flops 40-44 will remain in a corresponding constant phase relationship with respect to signal $O_H$.

By having signals $E_{16H}$, $E_{8H}$, $E_{4H}$, $E_{2H}$ and $E_H$ synchronized to signal $O_H$, these signals may be used to provide timing signals with edges that occur at predetermined instants during each period H of signal $O_H$. The resolution by which each such timing pulse or signal is provided is determined by the period of signal $O_{32H}$ or $O_{32H}'$. A horizontal rate signal 36 produced at an output terminal 53a of a flip-flop 53 that is used for generating a sawtooth reference signal in PCL 30 is a representative example of such timing signals.

To generate signal 36, signals $E_{4H}$, $E_{2H}$ and $E_H$ are coupled to corresponding input terminals of an AND gate 54 that produces a signal 54a having the TRUE state when each of such signals is at the TRUE state simultaneously with the other ones. Signal 54a is coupled to a data input receiving terminal 53c of a flip-flop 53. Signal $E_{8H}$ is coupled to a clock input receiving terminal 53b of flip-flop 53. Flip-flop 53 delays signal 54a by an interval having a duration that is determined by signal $E_{8H}$ to form signal 36. Signal 36 is at the TRUE state during approximately 8 microseconds and at the FALSE state during the rest of period H. By means of gate 54 and flip-flop 53, signal 36 is delayed relative to signal $O_H$ by a predetermined delay of, for example, 4 microseconds that is determined by signals $E_{8H}$, $E_{4H}$, $E_{2H}$ and $E_H$. Signal 36 is used for controlling the timing of a ramp generator 37 of IC 200 that is used by PCL 30, as described below.

Ramp generator 37 generates a sawtooth signal 37a that is coupled to an input terminal 38a of a voltage comparator 38. Generator 37 includes a current source $i_{cs}$ that is coupled to a capacitor $C_{37}$ that may be external to IC 200. A switch 37b of generator 37 is coupled across capacitor $C_{37}$ for discharging capacitor $C_{37}$ and for maintaining afterward sawtooth signal 37a across capacitor $C_{37}$ at a constant level as long as horizontal rate control signal 36 is at the TRUE state. When signal 36 is at the FALSE state, current source ics charges capacitor $C_{37}$ to form an upramping portion 37c of signal 37a.

Signal $O_H$ is also coupled via a flip-flop 39 to an input terminal 57a of a second phase detector 57. Flip-flop 39 is clocked by signal $E_{8H}$ to provide a delayed signal 39a that is delayed relative to signal $O_H$ by approximately 4 microseconds. The purpose of utilizing the 4 microsecond delay is to compensate for various delays in PCL 30 such as in a network 58 that is discussed below. A signal $F_H$, developed in a winding 136 of flyback transformer T0, is coupled via delay and pulse shaping network 58, that was mentioned before, to a second input terminal 57b of phase detector 57.. Signal $F_H$ is indicative of the phase of deflection current $i_y$ in deflection winding $L_Y$. An output signal 59 of detector 57 that is indicative of the phase difference between signal 39a and signal $F_H$ is sampled and held in capacitor 66 to form a control signal 66a at a second input terminal 38b of comparator 38.

When, during a given period H, ramping portion 37b of signal 37a becomes greater than signal 66a at terminal 38b of comparator 38, comparator 38 generates a signal transition edge of an output signal 60 that is coupled to a triggering input terminal 61a of a one-shot flip-flop 61. Flip-flop 61 then generates a pulse $D_{Ha}$ having, illustratively, a constant duration that is coupled to horizontal driver 33 to cause transistor Q1 to become nonconductive, for example. Comparator 38 varies a phase of pulse $D_{Ha}$ relative to that of signal $O_H$ in such a manner that signal $F_H$ will have a constant phase relationship relative to signal $O_H$. Thus, a change in the ultor loading at terminal 35a of a high voltage supply 35 that tends to cause a change in the phase of signal $F_H$, will cause a corresponding change in control signal 66a that will vary the phase in the delay of pulse $D_H$ in a negative feedback manner. The change in the phase of pulse $D_{Ha}$ will maintain the phase of signal $F_H$ and of deflection current $i_y$ constant relative to signal $O_H$ despite the change in phase of signal $F_H$.

The tracking response time in PCL 30 with respect to phase variations of retrace signal $F_H$ is faster than the corresponding tracking response in PLL 20 with respect to phase variations of synchronizing input signal $S_H$. This is so, because PCL 30 is optimized to accommodate fast switching time variations in output stage 99 that may occur because of fast changing electron beam current; whereas, PLL 20 is optimized to reject noise or jitter accompanying the sync-pulses in signal $S_H$.

During the lock-in interval that occurs, for example, immediately after a new television channel is selected for viewing, the phase of the signal component of signal $O_{32H}$ at the fundamental frequency may vary relative to that of signal $S_H$. Simultaneously, the phase of the harmonics of signal $O_{32H}$ may also vary relative to that at the fundamental frequency. The result is that the waveform of signal $O_{32H}$ changes during the lock-in interval. Without the operating arrangement 300, the change in the waveform of signal $O_{32H}$ might have caused the duty cycle of signal $O_{32H}$ to vary from the nominal value of 50%. Such deviation in the duty cycle might be undesirable because it might have caused divider 45 and its initialization circuit that includes flip-flop 51 to assume erroneous states resulting in an undesirable transient condition in PCL 30. Disadvantageously, such undesirable transient condition in PCL 30 might cause, for example, a high voltage protection circuit, not shown in the FIGURE, to trigger. To prevent such undesirable transient conditions, arrangement 300, advantageously, maintains signal $O_{32H}'$ at 50% duty cycle and maintains the phase of signal $O_{32H}'$ the same relative to the signal component of signal $O_{32H}$ that is at the fundamental frequency $32Xf_H$.

WHAT IS CLAIMED:
1. A television deflection apparatus, comprising:
   a source of a synchronizing input signal at a frequency that is related to a deflection frequency;
   a resonant circuit;
   a phase-lock-loop circuit including a first oscillator responsive to said input signal for generating a first signal at a frequency that is related to said deflec- tion frequency that is coupled to said resonant circuit, said resonant circuit tuned to generate a second signal that is synchronized to said first signal such that undesirable high order harmonics are filtered out from said second signal;

an amplifier stage having regenerative feedback and having an input terminal that is coupled to said second signal for generating a third signal at a corresponding frequency;

a ramp generator responsive to said third signal for generating a ramp signal having a sawtooth waveform at a phase that is determined by a phase of said third signal;

a deflection circuit output stage responsive to a control signal for generating a deflection current in a deflection winding at a phase that is determined by a phase of said control signal and for generating a phase indicative signal that is indicative of said phase of said deflection current;

a phase detector responsive to said synchronizing signal and to said phase indicative signal for generating a phase difference indicative signal in accordance with a phase difference between said phase indicative signal and said synchronizing signal; and phase shifting means responsive to said phase difference signal and to said ramp signal for generating said control signal having said phase that varies in accordance with said phase difference signal.

2. An apparatus according to claim 1 further comprising a capacitance for capacitively coupling said first signal to said resonant circuit.

3. An apparatus according to claim 1 wherein said resonant circuit and said regenerative amplifier form a second oscillator such that said resonant circuit determines a free running frequency of said second oscillator.

4. An apparatus according to claim 3 wherein during a transient interval when said first signal is significantly disturbed the frequency of said third signal is determined by the free running frequency of said second oscillator instead of by said first signal.

5. An apparatus according to claim 1 wherein said first signal is generated in a first integrated circuit and said regenerative amplifier stage is included in a second integrated circuit and wherein said amplifier stage prevents undesirable signal harmonics that are included in said first signal from affecting a waveform of said second signal.

6. An apparatus according to claim 1 wherein said amplifier stage comprises a pair of transistors coupled as a differential amplifier configuration and wherein a collector of one is coupled to the base of the other one.

7. An apparatus according to claim 1 wherein said amplifier stage generates said third signal at 50% duty cycle.

8. An apparatus according to claim 1 further comprising, a frequency divider arrangement responsive to said third signal for generating corresponding timing signals that are coupled to said ramp generator to control said phase of said ramp signal.

9. An apparatus according to claim 1 wherein said phase-lock-loop circuit includes a first frequency divider for generating a fourth signal at a frequency that is lower than that of said third signal and wherein said fourth signal is coupled to said phase detector for generating said phase difference indicative signal.

10. A television apparatus for generating an output signal that is synchronized to a synchronizing input signal, comprising:

a source of said synchronizing input signal;

a controllable oscillator having a resonant frequency determining element and responsive to a control signal for producing a first signal at a fundamental frequency that is higher than that of said input signal, said first signal including harmonic signal content that varies when said control signal varies;

means responsive to said input signal and to said first signal for generating said control signal in accordance with a phase difference therebetween such that said oscillator and said control signal generating means form a phase-lock-loop circuit;

a tuned filtering circuit coupled to said first signal for filtering said harmonic signal content to generate a filtered second signal at the fundamental frequency of said first signal with substantially reduced harmonic signal content;

means responsive to said filtered second signal for generating said output signal; and a phase-control-loop circuit coupled to said output signal generating means and responsive to said filtered second and output signals for synchronizing said output signal to said second signal.

11. An apparatus according to claim 10 wherein said tuned filter comprises a capacitance and an inductance that are coupled in parallel.

12. An apparatus according to claim 10 wherein said tuned filtering circuit is capacitively coupled to said oscillator via a capacitance.

13. An apparatus according to claim 10 wherein said phase-control-loop circuit comprises a frequency divider responsive to said filtered second signal for generating a third signal at a frequency that is lower than that of said second signal and phase shifting means responsive to said third signal for phase shifting said third signal to generate said output signal.

14. An apparatus according to claim 10 further comprising a regenerative amplifier stage having an input terminal that is coupled to said tuned filtering circuit and an output terminal for generating at said output terminal of said amplifier stage a third signal.

15. A television deflection apparatus, comprising:

a source of a synchronizing input signal at a frequency that is related to a deflection frequency;

a resonant circuit;

a phase-lock-loop circuit including a first oscillator responsive to said input signal for generating a first signal at a frequency that is related to said deflection frequency that is coupled to said resonant circuit, said resonant circuit tuned to generate a second signal that is synchronized to said first signal such that undesirable high order harmonics are filtered out from said second signal;

an amplifier stage having regenerative feedback and having an input terminal that is coupled to said second signal for generating a third signal at a corresponding frequency;

a ramp generator responsive to said third signal for generating a ramp signal having a sawtooth waveform at a phase that is determined by a phase of said third signal;

a deflection winding ;

a deflection circuit output stage responsive to a control signal for generating a deflection current in said deflection winding at a phase that is determined by a phase of said control signal and for generating a phase indicative signal that is indicative of said phase of said deflection current;

a phase detector responsive to said synchronizing signal and to said phase indicative signal for generating a phase difference indicative signal in accordance with a phase difference between said phase indicative signal and said synchronizing signal; and
phase shifting means responsive to said phase difference indicative signal and to said ramp signal for generating said control signal having said phase that varies in accordance with said phase difference signal.

* * * * *